(12) United States Patent
Chang et al.

(10) Patent No.: US 9,042,242 B2
(45) Date of Patent: May 26, 2015

(54) IDENTIFYING METHOD AND PROTOCOL DATA UNIT GENERATING APPARATUS

(75) Inventors: Sung Cheol Chang, Daejeon (KR); Sung-Geun Jin, Daejeon (KR); Won-Ik Kim, Daejeon (KR); Kwang Jae Lim, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 851 days.

(21) Appl. No.: 12/999,158

(22) PCT Filed: Jul. 3, 2009

(86) PCT No.: PCT/KR2009/003655
§ 371 (c)(1),
(2), (4) Date: Dec. 15, 2010

(87) PCT Pub. No.: WO2010/005208
PCT Pub. Date: Jan. 14, 2010

(65) Prior Publication Data
US 2011/0116466 A1  May 19, 2011

(30) Foreign Application Priority Data

Jul. 8, 2008 (KR) ........................ 10-2008-0066013
Sep. 5, 2008 (KR) ........................ 10-2008-0087915
Jul. 2, 2009 (KR) ........................ 10-2009-0060364

(51) Int. Cl.
*H04L 12/26* (2006.01)
*H04J 3/24* (2006.01)
*H04W 4/00* (2009.01)
*H04W 8/26* (2009.01)
*H04L 12/801* (2013.01)
*H04L 29/06* (2006.01)
(Continued)

(52) U.S. Cl.
CPC .................. *H04W 8/26* (2013.01); *H04L 47/10* (2013.01); *H04L 69/22* (2013.01); *H04W 28/06* (2013.01); *H04W 76/021* (2013.01)

(58) Field of Classification Search
CPC ......... H04L 47/10; H04L 69/22; H04W 8/26; H04W 28/06; H04W 76/021
USPC .......................................... 370/252, 329, 474
See application file for complete search history.

(56) References Cited

U.S. PATENT DOCUMENTS

| 7,339,913 B2 | 3/2008 | Chou et al. |
| 2002/0042270 A1* | 4/2002 | Yi .................................. 455/424 |

(Continued)

FOREIGN PATENT DOCUMENTS

WO 2010/028312 A2 3/2010

OTHER PUBLICATIONS

Part 16: Air Interface for Fixed and Mobile Broadband Wireless Acess Systems, Oct. 2004, IEEE, pp. 1-893.*

(Continued)

*Primary Examiner* — Steven H Nguyen
(74) *Attorney, Agent, or Firm* — Jefferson IP Law, LLP

(57) ABSTRACT

A terminal identifying method identifies a terminal in a media access control layer, and includes allocating a station ID to the terminal for identifying the terminal, and allocating a flow ID to a connection in the terminal for identifying the connection in the terminal.

9 Claims, 3 Drawing Sheets

(51) Int. Cl.
  *H04W 28/06* (2009.01)
  *H04W 76/02* (2009.01)

(56) References Cited

U.S. PATENT DOCUMENTS

| | | |
|---|---|---|
| 2006/0171417 A1* | 8/2006 | Ihm et al. .................... 370/474 |
| 2008/0002567 A1* | 1/2008 | Bourlas et al. ............... 370/208 |
| 2008/0101376 A1 | 5/2008 | Do et al. |
| 2008/0137601 A1 | 6/2008 | Sung et al. |
| 2010/0027457 A1* | 2/2010 | Okuda .......................... 370/315 |

OTHER PUBLICATIONS

Sassan Ahmadi, An Overview of Next-Generation Mobile WIMAX Technology, Intel Corporation, IEEE Communications Magazine, Jun. 2009.

* cited by examiner

IDENTIFYING METHOD AND PROTOCOL DATA UNIT GENERATING APPARATUS

TECHNICAL FIELD

The present invention relates to an identifying method and a protocol data unit generating apparatus.

BACKGROUND ART

A protocol data unit (hereinafter referred to as PDU) used for transmitting information in a media access control (hereinafter referred to as MAC) layer generally includes a header and a payload.

The header of the PDU includes a connection identifier CID, which is an identification number for connection between a base station and a terminal. Generally, the connection identifier has a fixed length of 16 bits. Transmitting and receiving the connection identifier may cause overhead of a communication system.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to generate an effective PDU having advantages of reducing a system overhead.

Solution to Problem

According to an aspect of the present invention, a terminal identifying method identifies a terminal in a media access control layer and includes allocating a station ID to the terminal for identifying the terminal, and allocating a flow ID to a connection in the terminal for identifying the connection in the terminal.

The allocating the station ID to the terminal may be performed when the terminal is connected or reconnected to a network.

The connection may be identified by a combination of the station ID and the flow ID.

The terminal identifying method may further include generating a protocol data unit (PDU) including a PDU header. In this case, the PDU header may include the flow ID.

The PDU header may further include a station ID included field controlling whether the station ID exists.

The flow ID may be 4 bits.

The terminal identifying method may include acquiring the station ID from resource allocation information.

The terminal identifying method may include acquiring the station ID from a downlink control channel or a map.

According to another aspect of the present invention, a terminal identifying method identifies a terminal in a media access control layer, and includes allocating a station ID to the terminal for identifying the terminal, and allowing a base station to allocate a flow ID to a connection in the terminal for identifying the connection.

The connection may be identified by a combination of the station ID and the flow ID.

The terminal identifying method may further include generating a PDU including a PDU header. In this case, the PDU header may include the flow ID.

According to a further aspect of the present invention, a PDU generating apparatus includes a generic PDU generator generating a generic PDU, a light PDU generator generating a light PDU including transmission data having a smaller size than those of the generic PDU, and a control PDU generator generating a control PDU transmitting control information. The generic PDU, the light PDU, and the control PDU each include a PDU type field for defining the type of the corresponding PDU.

The generic PDU may include a generic header including the PDU type field, payloads including transmission data, and a packing sub-header concatenating at least two payloads and transmitting them.

The generic PDU may include a generic header including the PDU type field, a payload including transmission data, and a fragment sub-header fragmenting the payload into at least two fragments and transmitting the fragments.

The generic header may further include a flow ID field managing a connection with another communication partner in the one terminal, and an encryption & key sequence field defining whether an encryption function is applied and a key sequence ID.

The PDU generating apparatus may further include a grant management sub-header managing resource allocation, or an extended sub-header including informations of an automatic retransmit request (ARQ) in the case of when the payload is an automatic retransmit request (ARQ) feedback payload. In this case, the generic header further includes an type encoding field defining whether a sub-header is used.

The packing sub-header may include a block sequence number field defining a number which indicates the start of the contents of a service data unit (SDU), and identifies data in a connection, a flow ID field, and a flow ID included field defining whether the flow ID is used.

The fragment sub-header may include a block sequence number field defining a number that identifies data in a connection.

The light PDU may include a light header including the PDU type field, an encryption & key sequence field defining whether an encryption function is applied and an key sequence ID, a flow ID field managing a connection with another communication partner in a terminal, and a block sequence number field defining a number that indicates the start of the contents of a service data unit and identifies data in a connection.

The control PDU may further include an encryption & key sequence field defining whether an encryption function is applied and an key sequence ID, a content type field defining an information kind of the control PDU, and a cyclic redundancy check (CRC) field checking an error.

Advantageous Effects of Invention

According to the exemplary embodiments of the present invention, it is possible to generate an efficient PDU, thereby reducing a system overhead and efficiently use resources.

MODE FOR THE INVENTION

Figure 1:
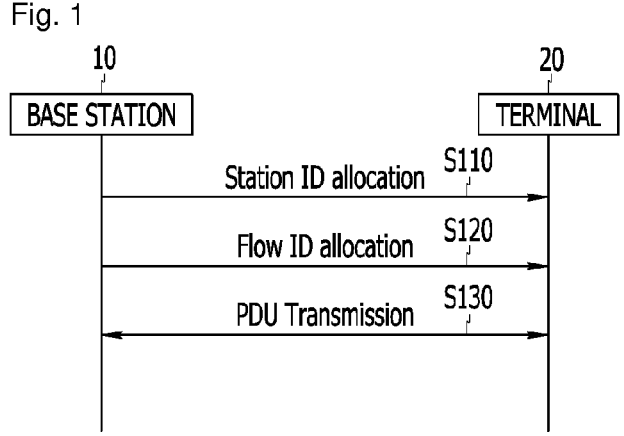
FIG. 1 is a drawing illustrating a terminal identifying method according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the mobile station, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the access point, the radio access station, the node B, the eNodeB, the base transceiver station, the MMR-BS, etc.

A terminal identifying method according to an exemplary embodiment of the present invention will now be described with reference to the accompanying drawings.

FIG. 1 is a drawing illustrating a terminal identifying method according to an exemplary embodiment of the present invention.

Referring to FIG. 1, a media access control layer of a base station 10 allocates a station ID (STID) to a terminal 20 to identify the terminal 20 in a cell (or an area of the base station) (S110). The station ID may be allocated to the terminal 20 when the terminal 20 is connected or reconnected to a network. Next, the media access control layer allocates a flow ID (FID) to the terminal 20 to identify the corresponding connection in the terminal 20 (S120). Subsequently, when a PDU corresponding to the connection is generated, the media access control layer of the base station 10 inserts the flow ID allocated to the corresponding connection to a header of the PDU and transmits the PDU (S130).

As described above, a media access control layer according to an exemplary embodiment of the present invention may divide a media access control identifier (hereinafter referred to as MAC ID) into a station ID and a flow ID, whereby each connection may be identified by a combination of a station ID and a flow ID. Further, as described above, a PDU header has only a flow ID. Therefore, the size of the PDU header is smaller than when a media access control identifier is inserted to a PDU header, resulting in a reduction in system overhead.

Now, a PDU generating apparatus according to an exemplary embodiment of the present invention will be described in detail.

Figure 2:
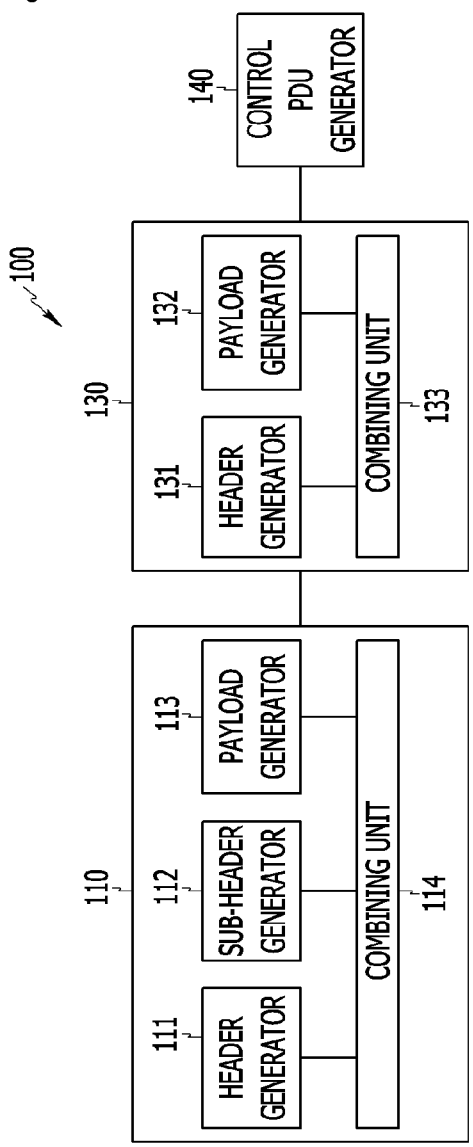
FIG. 2 is a block diagram illustrating a PDU generating apparatus according to an exemplary embodiment of the present invention.

FIG. 2 is a block diagram illustrating a PDU generating apparatus according to an exemplary embodiment of the present invention.

A PDU generating apparatus 100 generates three kinds of PDUs in accordance with characteristics of service data units (hereinafter referred to as SDU).

The PDU generating apparatus 100 includes a generic PDU generator 110 for generating a generic PDU, a light PDU generator 130 for generating a light PDU, and a control PDU generator 140 for generating a control PDU.

A generic PDU generated by the generic PDU generator 110 will now be described with reference to FIGS. 3 and 4.

Figure 3:
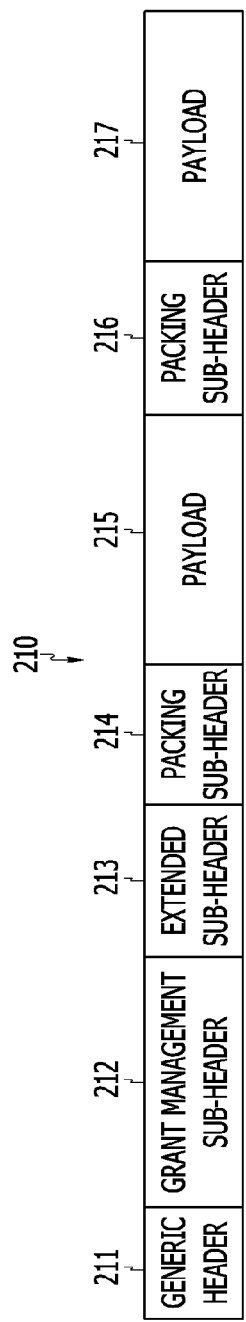
FIG. 3 is a drawing illustrating an exemplary generic PDU generated by a PDU generating apparatus according to an exemplary embodiment of the present invention.
Figure 4:
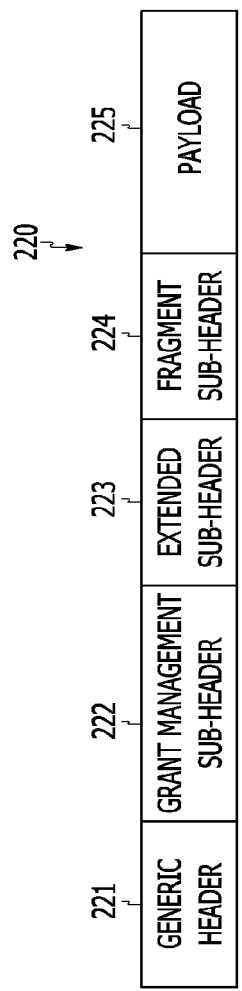
FIG. 4 is a drawing illustrating another exemplary generic PDU generated by a PDU generating apparatus according to an exemplary embodiment of the present invention.

FIG. 3 is a drawing illustrating an exemplary generic PDU generated by a PDU generating apparatus according to an exemplary embodiment of the present invention, and FIG. 4 is a drawing illustrating another exemplary generic PDU generated by a PDU generating apparatus according to an exemplary embodiment of the present invention.

Referring to FIG. 3, a generic PDU 210 includes a generic header 211 and payloads 215 and 217, and may further include at least one of a grant management sub-header 212, an extended sub-header 213, and packing sub-headers 214 and 216.

The generic header 211 is for operating and controlling the payloads 215 and 217.

The grant management sub-header 212 manages resource allocation.

The extended sub-header 213 includes informations of an automatic retransmit request (ARQ) in the case of when the payloads 215 and 217 are automatic retransmit request (ARQ) feedback payloads.

When the sizes of the payloads 215 and 217 are small, the packing sub-headers 214 and 216 concatenate two or more payloads 215 and 217 and transmit them.

The payloads 215 and 217 are parts including data to be actually transmitted.

Referring to FIG. 4, a generic PDU 220 includes a generic header 221 and a payload 225, and may further include at least one of a grant management sub-header 222, an extended sub-header 223, and a fragment sub-header 224.

The generic header 221, the grant management sub-header 222, the extended sub-header 223, and the payload 225 each have the same function as a corresponding part of the generic PDU 210.

When the size of the payload 225 to be transmitted is large, the fragment sub-header 224 divides the payload 225 into fragments and transmits the fragments.

Referring to FIG. 2 again, the generic PDU generator 110 includes a header generator 111, a sub-header generator 112, a payload generator 113, and a combining unit 114.

The header generator 111 generates the generic headers 211 and 221 of the generic PDUs 210 and 220 shown in FIGS. 3 and 4. The generic headers 211 and 221 generated by the header generator 111 each have fields as shown in the following Table 1.

TABLE 1

| Field Item | Size |
| --- | --- |
| PDU Type | 2 bit |
| Reserved | 1 bit |
| Length | 11 bit |
| Encryption & Key Sequence | 2 bit |
| Flow ID | 4 bit |
| Type Encoding | 4 bit |

Referring to Table 1, each of the generic headers 211 and 221 has a PDU type field, a reserved field, a length field, an encryption & key sequence field, a flow ID field, and a type encoding field.

The PDU type field is 2 bits, and may have a value of, for example, '01', and may define that a corresponding PDU is a generic PDU.

The reserved field is 1 bit, and is a field reserved for future use.

The length field is 11 bits, and defines the length of a portion, except for a generic header 211 or 221, of a corresponding generic PDU 210 or 220.

The encryption & key sequence field is 2 bits, and defines whether an encryption function is applied to a corresponding PDU header 211 or 221 and a key sequence when encryption is applied. For example, when the encryption & key sequence field has a value of 00, an encryption function is not applied, and when the encryption & key sequence field has any one of the other values, 01, 10, and 11, the value of the encryption & key sequence field defines a key sequence. The encryption & key sequence field according to an exemplary embodiment of the present invention encrypts only a corresponding payload 215 or 217.

The flow ID field is 2 bits, and is a field defining a connection in a terminal. A MAC ID is divided into a part for identifying a terminal when the terminal is connected or reconnected to a network in a cell and a part for managing connections in the terminal, and the flow ID is an identifier for managing the connections in the terminal.

Meanwhile, identifying a terminal in a network is performed by a station ID (STID) that is included in a downlink control channel or a MAP. One station ID identifier may simultaneously designate a plurality of users, and the plurality of users may receive resources corresponding to the corresponding station ID.

Each of the PDU headers 211 and 221 may include a station ID included field defining whether a station ID exists.

Station ID defining methods include an explicit method and an implicit method. In the explicit method, a station ID included field defines that a station ID exists in a corresponding PDU header 211 or 221, and a station is identified by the station ID located in the corresponding PDU header 211 or 221. Station identifying is not performed in a downlink control channel or a MAP. In the downlink control channel or the MAP, common resources are allocated to a plurality of terminals, the terminals receiving the allocated resources recognize the PDU headers 211 and 221, and identifying the PDU for individual users is performed by station IDs.

In the implicit method, a station ID included field defines that a station ID does not exist in a corresponding PDU header 211 or 221. No station ID is located in the corresponding PDU header 211 or 221. User identifying in a downlink control channel or a map is performed by using station IDs. Resources are allocated to individual stations in the downlink control channel or the map on the basis of station ID information. The station IDs are not located in PDUs of the resources.

Both of the explicit method and the implicit method are used in a downlink. In an uplink, since resources allocated to individual users are used, the implicit method is used.

Referring to Table 1 again, the type encoding field is 4 bits, and defines whether a sub-header is used. For example, among the bits of the value of the type encoding field, the $0^{th}$ bit may define whether a grant management sub-header is used, the $1^{st}$ bit may define whether an extended sub-header is used, the $2^{nd}$ bit may define whether the fragment sub-header is used, and the $3^{rd}$ bit may define whether packing sub-headers are used.

Referring to FIG. 1 again, the sub-header generator 112 generates the grant management sub-headers 212 and 222, the extended sub-headers 213 and 223, the fragment sub-header 224, and the packing sub-headers 214 and 216 shown in FIGS. 3 and 4.

The packing sub-headers 214 and 216 generated by the sub-header generator 112 each have fields as shown in the following Table 2.

TABLE 2

| Field Item | Size |
| --- | --- |
| Fragment Control (FC) | 2 bit |
| Block Sequence Number (BSN) | 10 bit |
| Flow ID Included | 1 bit |
| Length | 11 bit |
| Flow ID | 4 bit |
| Reserved | 4 bit |

Referring to Table 2, each of the packing sub-headers 214 and 216 includes a fragment control field, a block sequence number field, a flow ID included field, a length field, a flow ID field, and a reserved field.

The fragment control field is 2 bits, and defines a method of fragmenting the payloads 215 and 217.

The block sequence number field is 10 bits, and defines a block sequence number indicating the start of service data unit contents. In an exemplary embodiment of the present invention, the block sequence number field is not exclusively used for automatic repeat request connections, but may also be used to store a data identification number in every connection.

The flow ID included field is 1 bit, and defines whether a flow ID for another connection is used.

The length field is 11 bits, and defines the lengths of the payloads 215 and 217 connected to the packing sub-headers 214 and 216.

The flow ID field is 4 bits, is available when a flow ID included field is set, and is transmitted to manage a connection in a terminal for a user.

Meanwhile, the fragment sub-header 224 generated by the sub-header generator 112 has fields as shown in the following Table 3.

TABLE 3

| Field Item | Size |
| --- | --- |
| Fragment Control (FC) | 2 bit |
| Block Sequence Number (BSN) | 10 bit |
| Reserved | 4 bit |

Referring to Table 3, the fragment sub-header 224 includes a fragment control field, a block sequence number field, and a reserved field, and a description thereof is the same as the description of corresponding fields of the packing sub-header 214 or 216.

The payload generator 113 generates the payloads 215, 217, and 225 including data to be actually transmitted.

The combining unit 114 combines the generic header 211 generated by the header generator 111, the grant management sub-header 212 generated by the sub-header generator 112, the extended sub-header 213, the packing sub-headers 214 and 216, and the payloads 215 and 217 generated by the payload generator 113 to generate the generic PDU 210, or combines the generic header 221 generated by the header generator 111, the grant management sub-header 222 generated by the sub-header generator 112, the extended sub-header 223, the packing sub-header 224, and the payload 225 generated by the payload generator 113 to generate the generic PDU 220.

Now, a light PDU generated by the light PDU generator 130 will be described in detail with reference to FIG. 5.

Figure 5:
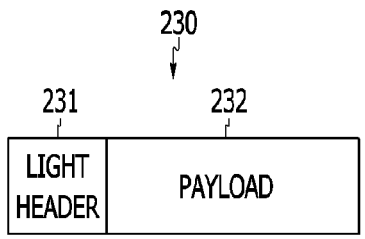
FIG. 5 is a drawing illustrating a light PDU generated by a PDU generating apparatus according to an exemplary embodiment of the present invention.

FIG. 5 is a drawing illustrating a light PDU generated by a PDU generating apparatus according to an exemplary embodiment of the present invention.

A light PDU 230 is generated when the size of data to be transmitted through a payload 232 is smaller than those of the generic PDU 210 or 220 as in, for example, voice over internet protocol (VoIP).

Referring to FIG. 5, the light PDU 230 includes a light header 231 and a payload 232. The light header 231 is a field for operating and controlling the payload 232, like the generic header 211 or 221 of FIG. 3 or FIG. 4, and the payload 232 is a field including actual data.

Referring to FIG. 2 again, the light PDU generator 130 includes a header generator 131, a payload generator 132, and a combining unit 133.

The header generator 131 generates the light header 231 included in the light PDU 230 shown in FIG. 5. The light header 231 generated by the header generator 131 has fields as shown in the following Table 4.

TABLE 4

| Field Items | Size |
| --- | --- |
| PDU Type | 1 bit |
| Length | 7 bit |
| Encryption & Key Sequence | 2 bit |
| Flow ID | 4 bit |
| Block Sequence Number (BSN) | 10 bit |

Referring to Table 4, the light header 231 includes a PDU type field, a length field, an encryption & key sequence field, a flow ID field, and a block sequence number field.

The PDU type field is 1 bit. For example, when the value of the PDU type field is 1, a corresponding PDU may be the light PDU 230.

The length field is 7 bits, and defines the length of the light PDU 230 except for the light header 231.

The encryption & key sequence field, the flow ID field, and the block sequence number field are the same as above.

The payload generator 132 generates the payload 232 including data to be actually transmitted.

The combining unit 133 combines the light header 231 generated by the header generator 131 and the payload 232 generated by the payload generator 132 to generate the light PDU 230.

A control PDU generated by the control PDU generator 140 will now be described in detail with reference to FIG. 6.

Figure 6:
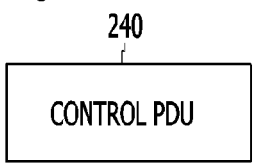
FIG. 6 is a drawing illustrating a control PDU generated by a PDU generating apparatus according to an exemplary embodiment of the present invention.

FIG. 6 is a drawing illustrating a control PDU generated by a PDU generating apparatus according to an exemplary embodiment of the present invention.

A control PDU 240 is a PDU transmitting MAC control information, and has fields as shown in the following Table 5.

TABLE 5

| Field Item | Size |
| --- | --- |
| PDU Type | 2 bit |
| Encryption & Key Sequence | 2 bit |
| Content type | 4 bit |
| Contents | 32 bit |
| cyclic redundancy check (CRC) | 8 bit |

Referring to Table 5, the control PDU 240 includes a PDU type field, an encryption & key sequence field, a content type field, a content field, and a cyclic redundancy check field.

The PDU type field is 2 bits. For example, if the PDU type field has a value of 00, a corresponding PDU may be a control PDU.

The encryption & key sequence field is the same as above.

The content type field is 4 bits, and defines the type of control PDU information.

The content field is 32 bits, and has a format fixed in accordance with the content type. The following Table 6 represents exemplary formats of the content field according to the types of contents.

TABLE 6

| | | CE Type | | |
| --- | --- | --- | --- | --- |
| Value | bits | CE Name | CE Fields | CE Description |
| 0x0 | 4 | Padding | — | Zero padding |
| 0x1 | 4 | Aggregated bandwidth request | UCID(4) + BW request(20) | For the UCID, the number of band width, in bytes, requested by the MS. |
| 0x2 | 4 | Average DL CINR | Average DL CINR(5) + reserved(3) | On the preamble and common pilot |
| 0x3 | 4 | Preferred DL TF | DL TF(4) + DCD change count(4) | Preferred DL TF in compliance with the DCD message identified by the DCD change count. |
| 0x4 | 4 | UL transmit power | UL Tx power(8) + UL headroom(6) + reserved(2) | UL transmit power level in dBm and headroom to UL maximum power level in dB for the burst that carries this Control MAC PDU. |
| 0x5 | 4 | Band CINR | Band bitmap(10) + Band CINR#1(5) + Band CINR#2(5) + Band CINR#3(5) + reserved(3) | In logical band bitmap, the bit '1' indicates the selected bands of five best logical bands. Band CINRs mean the CINRs of the bands according to the appearing order in the bitmap. |

TABLE 6-continued

| CE Type | | | | |
|---|---|---|---|---|
| Value | bits | CE Name | CE Fields | CE Description |
| 0x6 | 4 | Differential Band CINR | Differential CINRs(5) + reserved(3) | 1-bit report for each five selected logical bands |
| 0x7 | 4 | Post-Rx CINR I | Post-Rx CQI(5) | Post-Rx CQI at the MS |
| 0x8 | 4 | Post-Rx CINR II | Post-Rx CQI#1(5) + Post-Rx CQI#2(5) + Post-Rx CQI#3(5) + Post-Rx CQI#4(5) | Post-Rx CINR for each stream. The CINR of 0b00000 means no report. |
| 0x9 | 4 | Precoding I | Codebook index(6) + Average CQI(5) + reserved(1) | For precoding matrix and Average CQI over streams. |
| 0xA | 4 | Precoding II | Codebook index(6) + Stream CQI#1(5) + Stream CQI#2(5) + Stream CQI#3(5) + Stream CQI#4(5) + reserved(2) | Post-Rx CINR for each stream. The CINR of 0b00000 means no report. |
| 0xB | 4 | BR and UL transmit power | BW request(11) + UL Tx power(8) + reserved(1) | Incremental bandwidth request and UL transmit power level in dBm for the burst that carries this Control MAC PDU. |
| 0xC | 4 | BR and average DL CINR | BW request(11) + DL CINR(8) + reserved(1) | Incremental bandwidth request and CINR measured on the preamble and common pilot. |
| 0xD | 4 | BSN report | Position(2) + BSN#1(6) + BSN#2(6) + BSN#3(6) + BSN#4(6) + reserved(2) | See the following text after this table. |
| 0xE | 4 | Extended-1 type prefix | — | |
| 0xF | 4 | Extended-2 type prefix | — | |
| 0xE0 | 8 | Reserved | — | |
| 0xE1 | 8 | Incremental bandwidth request | UCID(4) + BW request(12) | For the UCID, the number of band width, in bytes, requested by the MS. |
| 0xE2 | 8 | Rate change request | UCID(4) + Rate change request(2) | For UCID and extended rtPS only. See the following text after this table. |
| 0xE3 | 8 | CINR standard deviation | CINR standard deviation(8) | On the preamble and common pilot |
| 0xE4 | 8 | MIMO type | Permutation type(1) + MIMO type(2) + reserved(1) | Preferred DL transmission type. See the following text after this table. |
| 0xE5 | 8 | Anchor change request | Temp BSID(3) + mode(1) | For FBSS, Temp BSID in the active set. If mode is set to 1, it means the cancellation of anchor BS change request |
| 0xE6 | 8 | CQICH allocation request | Feedback type(3) + FBSS indication(1) + Preferred period(3) + reserved(1) | This requests CQICH allocation. A CQI feedback is transmitted on the CQICH every $2^p$ frames. |
| 0xE7 | 8 | NBR CINR and RSSI | Sector ID(8) + Sector CINR(5) + Sector RSSI(8) + reserved(3) | DL CINR and RSSI of neighboring sectors. |
| 0xE8 | 8 | UGS grant management | UCID(4) + SI(1) + PM(1) + FLI(1) + FL(4) + reserved(1) | Only for UGS service. See the following text after this table. |
| 0xE9 | 8 | ERTPS grant management | UCID(4) + PSI(1) + PSOBR(11) + FLI(1) + FL(4) | Only for ERT-VR service. See the following text after this table. |
| 0xEA | 8 | BR and sleep control | BW request(11) + PSCID(6) + Operation(1) | Incremental bandwidth request and power saving class control. See the following text after this table. |
| 0xEB | 8 | PHY channel report | DL TF(4) + DCD change count(4) + UL Tx power(8) + UL headroom(6) + reserved(2) | Preferred TF, UL transmit power level in dBm and headroom to UL maximum power level in dB for the burst that carries this Control MAC PDU. |
| 0xEC | 8 | CINR statistics | Average DL CINR(5) + CINR standard deviation(8) + reserved(3) | On the preamble and common pilot |
| 0xED | 8 | DL BSN request | Position(2) + reserved(2) | This CE is sent by the BS to request the MS to send the BSN report CE. See the following text after this table. |
| 0xEE | 8 | DL Sleep control | PSCID(6) + Operation(1) + reserved(1) | The BS activates or deactivates the power saving class indicated by the PSCID. See the following text after this table. |
| 0xEF | 8 | BR and NACK request | UCID(4) + BW request(8) | For the UCID, the number of aggregated band width, in bytes, requested by the MS. If NACK indicator = 1, the MS intending to send the HO-IND message requests a NACK-based response in the form of HO IND ACK IE. |

TABLE 6-continued

| CE Type | | | | |
|---|---|---|---|---|
| Value | bits | CE Name | CE Fields | CE Description |
| 0xF0 | 8 | Reserved | — | |
| 0xF1 | 8 | Group allocation request | Confirmation(1) + Request(2) + DL Group ID (4) + UL Group 1U (4) + reserved(1) | This is corresponding to the GA-REQ message. |
| 0xF2 | 8 | Group allocation response | Allocation(4) + DL Group ID (4) + DD Sub ID (4) + UL Group ID (4) + UL Sub ID (4) | This is corresponding to the GA-RSP message. |
| 0xF3~0xFF | 8 | Reserved | — | |

Meanwhile, the contents of Table 1 to Table 6 are just examples of PDUs, headers or sub-headers, or a field included in PDUs. However, the embodiments of the present invention are not limited thereto but can be variously modified.

The exemplary embodiments of the present invention are implemented not only through the apparatus and method, but may be implemented through a program that realizes functions corresponding to constituent members of the exemplary embodiments of the present invention or a recording medium in which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A protocol data unit (PDU) generating apparatus facilitating communication between a base station and a terminal, the PDU generating apparatus comprising:
    a generic PDU generator configured to generate a generic PDU comprising a generic PDU header including one or more sub-headers;
    a light PDU generator configured to generate a light PDU comprising payload data of a smaller size than a size of payload data of the generic PDU, the light PDU further comprising a light PDU header devoid of sub-headers; and
    a control PDU generator configured to generate a control PDU transmitting control information, the control PDU being devoid of a header,
    wherein each PDU generated by the PDU generating apparatus includes a PDU Type field, an entry in the PDU Type field indicating which of the generic PDU, the light PDU, and the control PDU that the PDU comprises.

2. The PDU generating apparatus of claim 1, wherein the PDU Type field is included in the generic PDU header and the generic PDU further comprises:
    a payloads comprising transmission data; and
    a packing sub-header concatenating at least two payloads and transmitting them.

3. The PDU generating apparatus of claim 2, wherein the packing sub-header comprises a Block Sequence Number field comprising an entry that identifies data in a connection.

4. The PDU generating apparatus of claim 1, wherein the generic PDU header comprises the PDU Type field and the generic PDU further comprises:
    a payload comprising transmission data; and
    a fragment sub-header for fragmenting the payload into at least two fragments and transmitting the fragments.

5. The PDU generating apparatus of claim 4, wherein the generic PDU header further comprises:
    a Flow ID field comprising an entry for managing a connection with another communication partner in the terminal; and
    an Encryption and Key Sequence field comprising an entry indicating whether an encryption function is applied and a key sequence ID.

6. The PDU generating apparatus of claim 4, wherein the generic PDU further comprises a Grant Management sub-header comprising an entry for managing resource allocation of an Extended sub-header comprising information of an automatic retransmit request (ARQ) in a case when the payload comprises an ARQ feedback payload, and
    wherein the generic PDU header further comprises a Type Encoding field comprising an entry indicating whether a sub-header is used.

7. The PDU generating apparatus of claim 4, wherein the packing sub-header comprises:
    a Block Sequence Number field comprising a number that indicates a start of contents of a Service Data Unit (SDU) and identifies data in a connection;
    a Flow ID field; and
    a Flow ID Comprised field comprising an entry indicating whether the Flow ID is used.

8. The PDU generating apparatus of claim 1, wherein the light PDU header includes the PDU Type field and the light PDU further comprises:
    an Encryption and Key Sequence field comprising an entry indicating whether an encryption function is applied and a key sequence ID;
    a Flow ID field comprising an entry for managing a connection with another communication partner in a terminal; and
    a Block Sequence Number field comprising a number that indicates a start of contents of a Service Data Unit (SDU) and identifies data in a connection.

9. The PDU generating apparatus of claim 1, wherein the control PDU further comprises:
    an Encryption and Key Sequence field comprising an entry indicating whether an encryption function is applied and a key sequence ID;
    a Content Type field comprising an entry indicating an information kind of the control PDU; and
    a Cyclic Redundancy Check (CRC) field for checking an error.

* * * * *